(12) United States Patent
Parker et al.

(10) Patent No.: US 7,668,914 B2
(45) Date of Patent: Feb. 23, 2010

(54) MILESTONE SYNCHRONIZATION IN BROADCAST MULTIMEDIA STREAMS

(75) Inventors: Alistair John Parker, Ouisparosis (CA);
Jeff Furlong, Grand Bay-Westfield (CA); Gino Louis Dion, Saint John (CA); Sean Gordon Higgins, Saint John (CA); Richard Bettelheim, Pacifica, CA (US); Christian Van Boven, Dendermonde (BE)

(73) Assignee: Alcatel Lucent, Paris (FR)

( * ) Notice: Subject to any disclaimer, the term of this patent is extended or adjusted under 35 U.S.C. 154(b) by 780 days.

(21) Appl. No.: 11/090,308

(22) Filed: Mar. 28, 2005

(65) Prior Publication Data

US 2006/0242240 A1 Oct. 26, 2006

(51) Int. Cl.
*G06F 15/16* (2006.01)
*G06F 15/173* (2006.01)
*G06F 3/00* (2006.01)
*H04N 7/167* (2006.01)
*H04N 7/10* (2006.01)
*H04N 7/12* (2006.01)
*H04L 12/20* (2006.01)
*H04H 20/71* (2008.01)
*H04J 3/18* (2006.01)

(52) U.S. Cl. .................... 709/205; 725/53; 725/63; 725/142; 725/32; 370/256; 370/467; 370/477; 375/240.2

(58) Field of Classification Search ................. 709/205; 725/63; 375/240; 380/216; 455/3.02
See application file for complete search history.

(56) References Cited

U.S. PATENT DOCUMENTS

| 5,850,572 | A | 12/1998 | Dierke et al. |
| 6,118,498 | A | 9/2000 | Reitmeier et al. |
| 6,493,872 | B1 * | 12/2002 | Rangan et al. ............... 725/32 |
| 6,728,965 | B1 | 4/2004 | Mao |
| 6,738,427 | B2 * | 5/2004 | Zetts .................... 375/240.28 |
| 6,829,250 | B2 * | 12/2004 | Voit et al. .................. 370/467 |
| 6,845,230 | B2 * | 1/2005 | Syed ........................ 455/3.02 |
| 6,847,656 | B1 * | 1/2005 | Wu et al. .................... 370/477 |
| 6,961,430 | B1 * | 11/2005 | Gaske et al. ................ 380/216 |
| 6,971,121 | B2 * | 11/2005 | West et al. .................. 725/142 |
| 7,023,924 | B1 * | 4/2006 | Keller et al. ........... 375/240.26 |
| 7,349,386 | B1 * | 3/2008 | Gou ........................... 370/356 |
| 7,373,652 | B1 * | 5/2008 | Bayrakeri et al. ............. 725/53 |
| 2002/0170067 | A1 | 11/2002 | Norstrom et al. |
| 2004/0034864 | A1 | 2/2004 | Barrett et al. |

(Continued)

FOREIGN PATENT DOCUMENTS

EP 1523190 4/2005

*Primary Examiner*—William C Vaughn, Jr.
*Assistant Examiner*—Muktesh G Gupta
(74) *Attorney, Agent, or Firm*—Kramer & Amado, PC

(57) ABSTRACT

A server at the edge of a broadband network distributes multimedia content streams to clients, while ensuring that the first data delivered to each client is key data (milestones) needed for correctly decoding the stream content. This is obtained by buffering the packets in the incoming stream and transmitting the packets from the buffer in an outgoing stream, starting with the most recent milestone placed in the buffer before a request to join the respective incoming stream is received. As the writing to and reading from the buffer are performed at different rates, the incoming and outgoing streams are eventually synchronized, at which point the client may be switched to receive the incoming stream directly.

18 Claims, 6 Drawing Sheets

U.S. PATENT DOCUMENTS

2004/0244058 A1 * 12/2004 Carlucci et al. ............. 725/135
2005/0041689 A1 * 2/2005 Wu et al. .................... 370/477
2005/0060446 A1 3/2005 Parry et al.

* cited by examiner

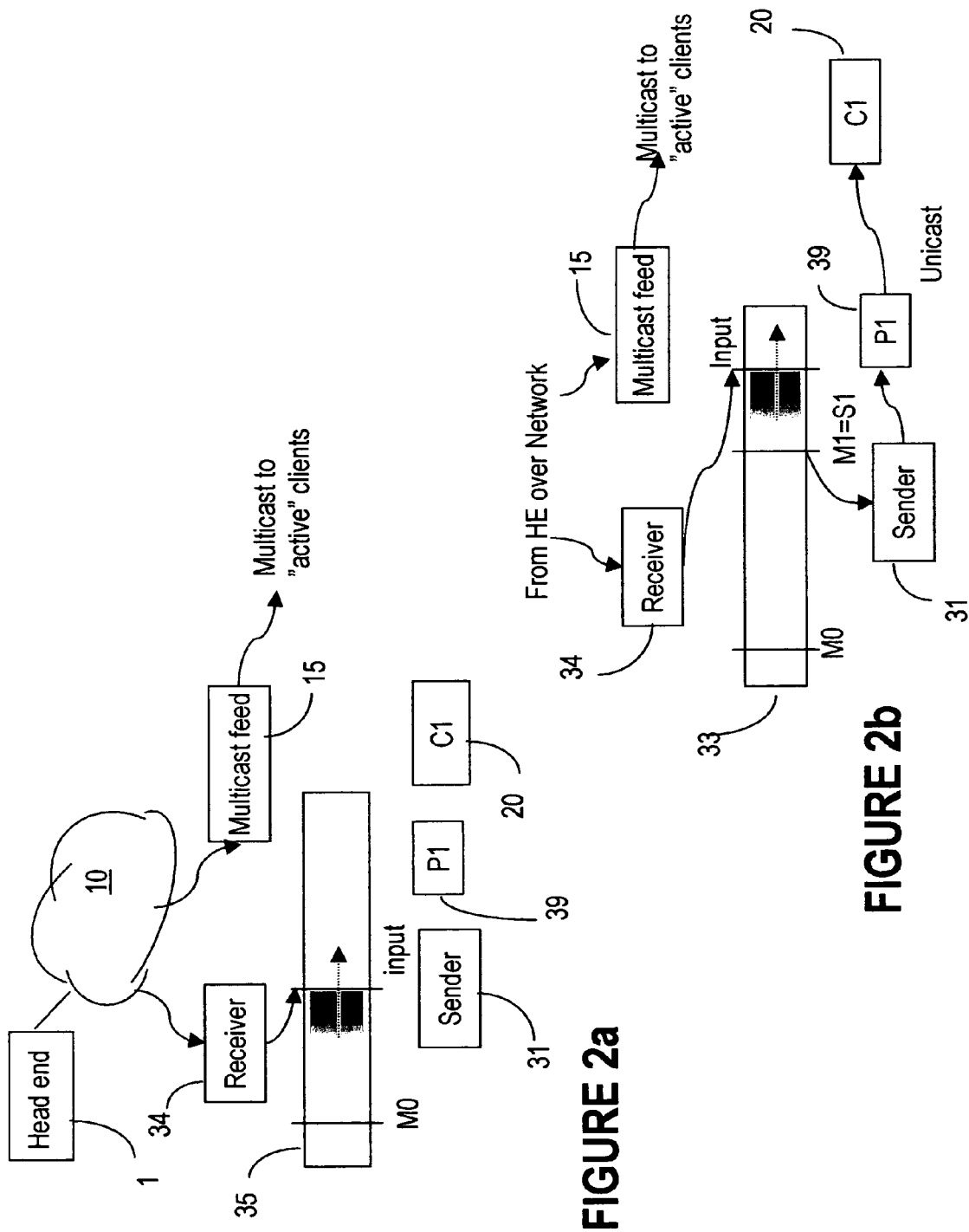

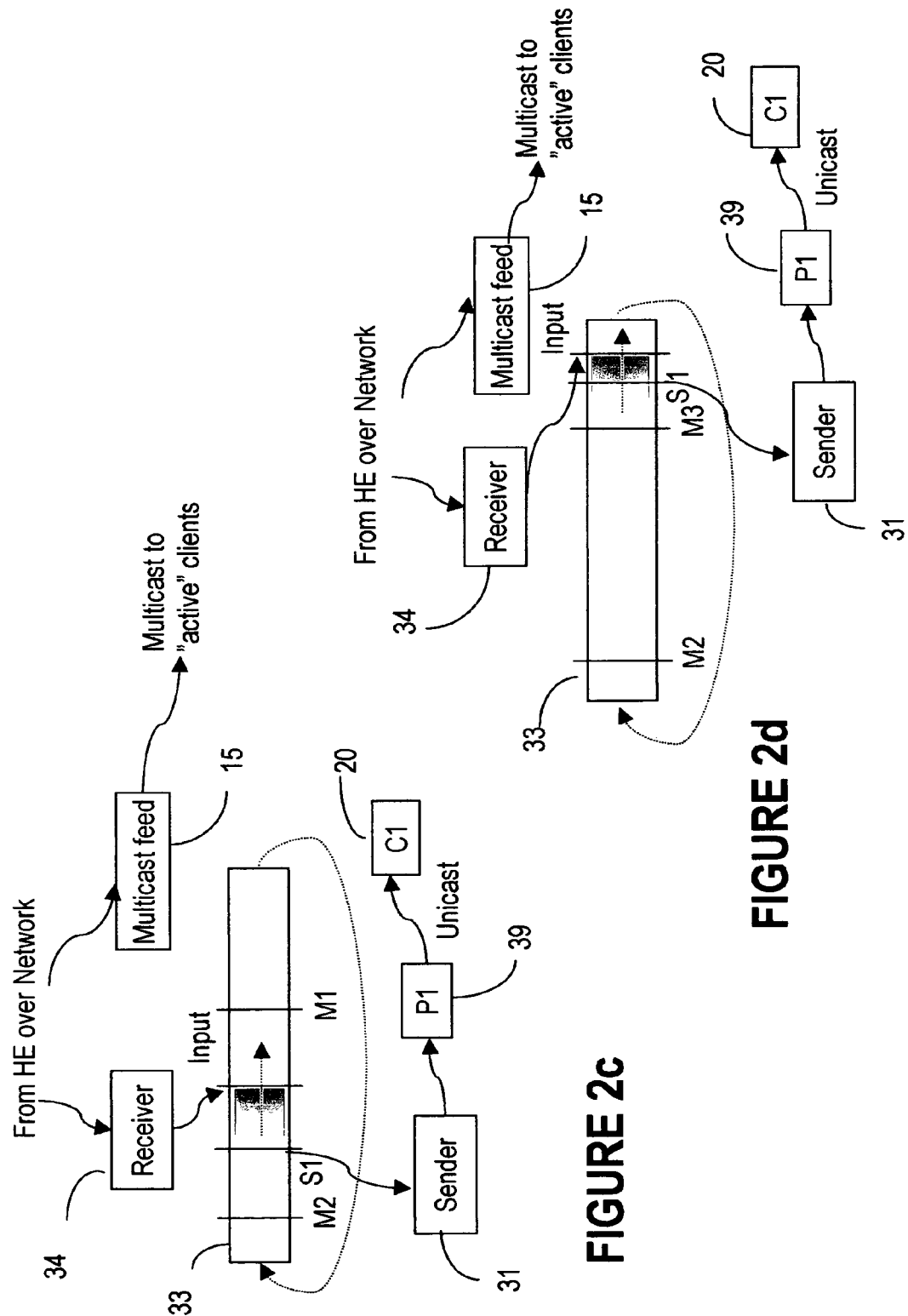

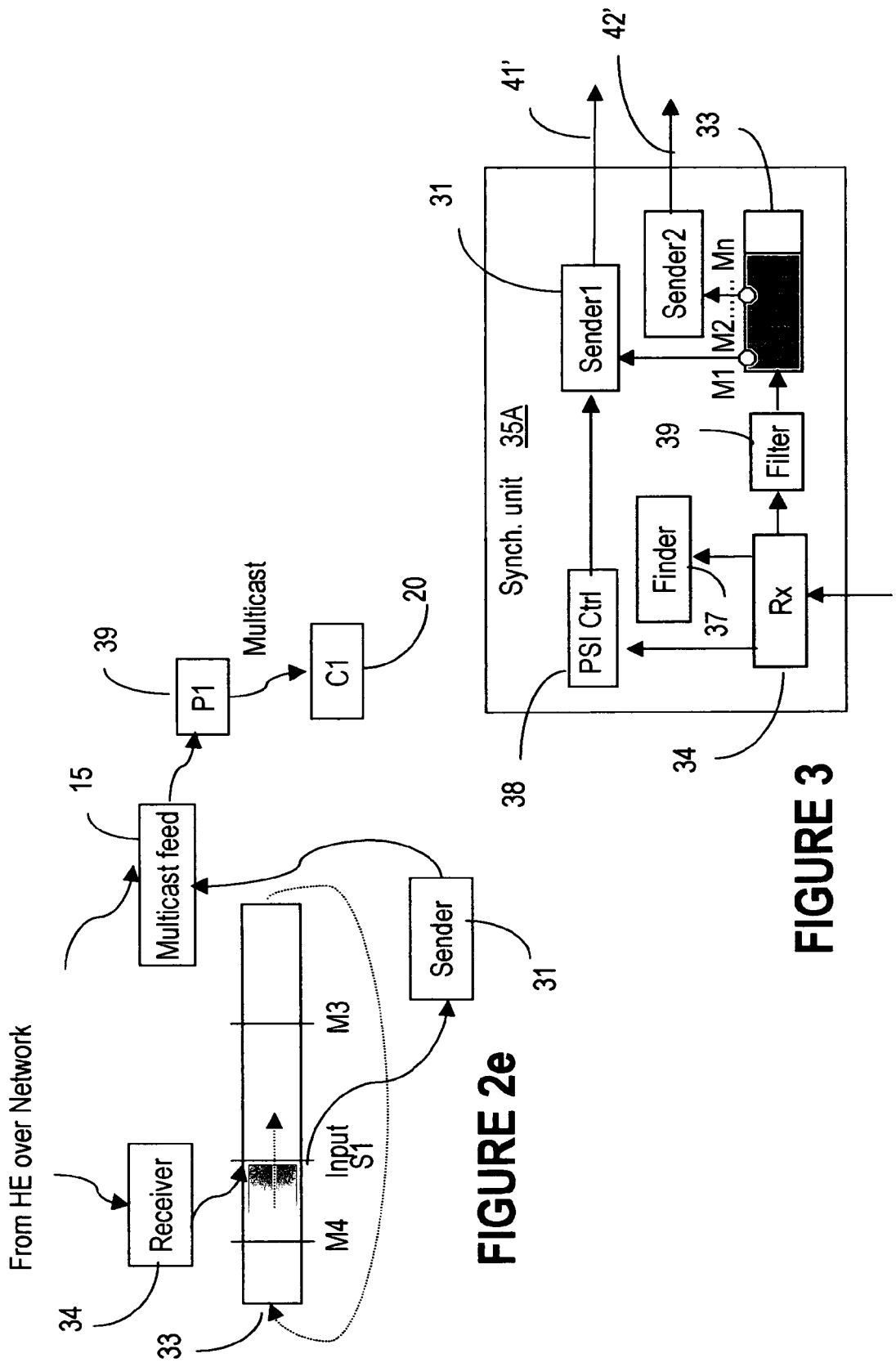

MILESTONE SYNCHRONIZATION IN BROADCAST MULTIMEDIA STREAMS

FIELD OF THE INVENTION

The invention is directed to providing entertainment over communication networks and in particular to fast synchronization of subscriber terminals to broadcast multimedia streams.

BACKGROUND OF THE INVENTION

Digital television offers viewers high quality video entertainment with features such as TV programming, pay-per-view (PPV), video-on-demand (VoD), games, as well as Internet access, collectively referred to as 'multimedia entertainment content', or 'content'. Use of communication networks for distribution of content continues to gain popularity, fuelled by the decreasing cost of equipment and bandwidth to the home, and emergence of interactive personalized services.

Because multimedia files tend to be large, the content is currently packaged in information streams, which are transmitted to the user via a broadband communication network. Each individual image in a sequence of images on film or video is referred to as a frame. Sequences of frames often contain pixels (picture elements) that are very similar or identical, such as green grass, blue sky, etc. Compression and motion compensation protocols, of which MPEG is widely spread today, are typically used to minimize these redundant pixels between adjacent frames for improving the use of transmission bandwidth. The video and audio specifications for compression/decompression (encoding/decoding) protocols give the syntax and semantics of encoded streams necessary for communicating compressed digital content as well as for storing and playing such video on media in a standard format.

To compress (encode) a stream carrying multimedia entertainment content, discrete samples in a stream are transformed into a bit-stream of tokens, which is much smaller than the corresponding initial stream, since essentially only data that has changed from frame to frame is captured in the compressed stream instead of capturing all information in the initial stream. The signal is broken into convenient sized data blocks, and header information is added to each data block; the header identifies the start of the packets and must include time-stamps because packetizing disrupts the time axis.

The multimedia encoding/decoding format tells the decoder how to inverse-represent the compacted stream back into data resembling the original stream of un-transformed data, so that the data may be heard and viewed in its normal form. However, if the decoder (receiver) is not reset on channel change, it will display noise if channels are simply switched. Hence, the receiver needs to delay processing video packets from the new channel until a certain pointer (also referred as key data or milestone) showing the start of a data block is received.

It is to be noted that MPEG (Moving Picture Experts Group) and specifically MPEG2 transport stream is used within this document to describe and illustrate the concepts at the base of the invention, but the invention is applicable to any multimedia stream format that incorporates milestones within the stream that can be identified and used to synchronize stream startup.

A MPEG transport stream used for transmission and digital broadcasting includes one or more video and audio packetized elementary streams (PES), each PES including an independent timebase for clock recovery and audio/video synchronization information. The transport stream also includes program guide and system information (PSI), conditional access information for enabling selective access to each program and its elements, and data services which may be associated with the programs. It is formed of short fixed-size packets, each carrying a packet identifier (PID); packets in the same elementary stream all have the same PID, so that the decoder can select the elementary streams it wants and reject the remainder.

The program specific information keeps track of the different programs in an MPEG transport stream and in the elementary streams in each program. PSI includes a Program Association Table (PAT), Program Map Tables (PMT) and Conditional Access Tables (CAT). The PAT (Program Association Table) includes data that the decoder uses to determine which programs exist in the respective transport stream. PAT points to a number of PMTs (one per program), which, in turn points to the video, audio, and data content of a respective program carried by the stream. A CAT is used for a scrambled stream. A PID of '0' indicates that the packet contains a PAT PID. A stream may also contain NULL packets, which carry no data but are necessary to maintain a constant bit rate with a variable payload. NULL packets always have a PID of 8191 (all 1's).

The most popular MPEG protocols used today are MPEG1 described in ISO/IEC 11172 and MPEG 2 described in ISO/IEC 13818. In MPEG2 video compression, each picture is first compressed (intra-frame compression), and then sequentially presented pictures are compressed together (inter-frame compression). In inter-frame compression, only the differences between a frame and frames it depends on are included in the compressed frame. As a result, decoding of a frame depends on the decoding of previously viewed frames and in some cases on the decoding of subsequently viewed frames. In order to minimize decoding problems, especially errors that may propagate from an erroneous decoding of one frame to cause the erroneous decoding of dependent frames, only a relatively small group of pictures (GOP) are compressed together (e.g. 9 pictures).

The pictures of each GOP are encoded together independently from the frames of any preceding GOPs and can thus be independently decoded and any errors can not propagate from group to group. The first frame in a GOP is known as an I-frame (intra-frame) which is an encoded, independently compressed picture, whose decoding can be performed independently of any other frame. The more I-frames are contained in a stream, the better quality the video will be; however, I-frames contain the most amount of bits and therefore take up more space on the storage medium.

In general, a client (receiver, decoder, set-top box, or player) has the option to select for viewing one of a plurality of channels, which are broadcast from a head-end or streamed from a server with pre-stored content files. A channel change is performed in response to a request from a certain client to the server; in response, the server provides the client with the new address from where to receive the new channel. The receiver leaves the currently viewed channel and joins the new channel. Channel change time in the IP-based audio/video transport systems creates significant delays in the consumer's TV viewing/surfing experience. Channel change speed is adversely impacted by a plurality of factors, such as key press propagation (from the channel selector to the server), IGMP leave/join operations latency, packet buffering and propagation, PAT/PMT latency, I-frame latency and frame decode and presentation times, to name a few.

Currently, a subscriber terminal joins a channel at a random point in the data stream and has to wait for key data structures (milestones) it needs to display fully synchronized audio and video. For a MPEG2 stream, the I-frame is one of these key data structures, PAT/PMT are others. A clean channel change requires the decoding to start on an I-frame (full frame). I-frames are only sent once or twice per second and even less frequently in contents encoded at lower bit rate, thus introducing a latency ranging from several hundreds of milliseconds to a couple of seconds. As this is an important delay, it has been an issue with DVB and ATSC (European and respectively North American standard for the streaming media broadcast systems) to date. However, channel change times less than one second are difficult to achieve today with the current technology. Attempts to reduce this server side delay are currently emerging. The present invention is directed to reducing the delays introduced by the I-frame latency.

For example, it has been proposed to connect a server at the edge of a broadband network with a view to provide clients in a certain geographical area with broadcast multimedia streams. The server is a stand-alone server, which receives streaming multimedia content from a content source in the broadband network. The server includes for each stream of multimedia content a buffer that manages and buffers multicast packets in the received stream. Once the server receives a request for a channel change, it instructs a sender for the currently streamed channel to stop sending that channel to the client, and instructs sender for the newly selected channel to first start bursting data from the respective buffer to the client as fast as possible. At some point, the system switches the subscriber terminal (receiver) over from the unicast stream (the burst) to a general multicast stream of the requested channel.

With this arrangement, the server must "talk" directly with the clients to request/terminate delivery of data, request a change of channel, negotiate missed blocks in the data, status reports, heartbeat, unicast/multicast transition, etc. The messaging may for example use Reliable Transport Protocol (RTP) which is able to identify each packet individually. In RTP, the server tells the client what the current packet is, and the client requests this data until it catches up with the current time, at which point it switches from the burst stream to the steady stream. As the frequency of milestone information needed to start the playout is deliberately kept low in order to reduce the BW, time and BW are wasted while the decoder waits to find the milestone information in the incoming stream.

Another disadvantage of this approach is that the client must be aware of the server, and is not able to change channels if the server is not accessible. Also, in the steady state (when a client views a certain channel) messaging is still used by the client to request and receive packets that are missing. As such, the client does not have any autonomy if the connection with the server is lost for whatever reason. This currently used technique also requires very careful planning for the network to be able to handle the data bursts when a terminal performs a channel change. This can be a serious problem particularly for HDTV (high definition TV) content, and especially with more then one terminal in the same house.

There is a need for a solution that significantly reduces channel change delays (channel zapping time).

SUMMARY OF THE INVENTION

In a system providing a number of multimedia channels to a set of clients, this invention provides a method to reduce channel change delays by feeding clients with information they require in order to quickly commence display of picture and sound.

Accordingly, the invention provides a broadcast system for delivering entertainment content to receivers over multimedia content streams, each stream characterized in that stream rendering cannot commence until a milestone data structure has been received, a server comprising: a listening mechanism for detecting a request indicating that a client wishes to receive a specified multimedia content stream carrying content of interest; a synchronization unit for streaming to the client an outgoing stream with the content of interest, starting with a most recent milestone data structure in the specified multimedia content stream with respect to the request receipt time from the time of request until the outgoing stream is synchronized with the specified multimedia content stream; and a multicast feed for receiving all said multimedia content streams from a head-end over a broadband network and distributing each stream to a respective client once the outgoing stream is synchronized with the specified multimedia content stream, wherein the most recent milestone data structure enables the client to immediately decode the content of interest from the outgoing stream.

Still further, the invention provides a broadcast system with a synchronization unit for delivering entertainment content to clients over multimedia content streams, each stream characterized in that stream rendering cannot commence until a milestone data structure has been received, a synchronization unit comprising: a circular buffer; a finder for detecting all milestone data structures in the specified multimedia content stream; a receiver for placing the packets from the specified multimedia content stream at the end of the buffer as they arrive, and keeping track of the position of the milestone data structures in the buffer; a sender for creating a marker in the buffer at the most recent milestone data structure relative to the time of arrival of the request, and for sending each next content packet from the position indicated by the marker, wherein the receiver places the packets in the buffer at a first rate and increments the marker at a second rate, higher than the first rate, until the marker position catches-up with the position of the last packet placed in the buffer.

As well, the invention provides a method for delivering entertainment content to receivers over multimedia content streams, each stream characterized in that stream rendering cannot commence until a milestone data structure has been received, comprising: a) listening for a request indicating that a client wishes to receive a specified multimedia content stream carrying content of interest; b) streaming to the client the content of interest in an outgoing stream, starting with a most recent milestone data structure in the specified multimedia content stream with respect to the request receipt time; c) synchronizing the outgoing stream with the specified multimedia content stream; and d) switching the client form receiving the outgoing stream to receive the specified multimedia content stream once the streams are synchronized.

Advantageously, the system and method according of the invention enable delivery and distribution of digital content to clients faster than the currently available solutions. Also, the present solution is receiver (subscriber terminal) agnostic; as the server must only process regular join/leave requests, no special messaging with the clients is necessary, so that there is no need to use any special protocol such as RTP for packet synchronization.

Still further, the solution proposed by this invention does not require any form of bursting of data, although this could be supported if required, due to specific network/client constraints. In addition, the invention scales significantly better than the prior art solutions, is more cost-effective, and can be used to provide additional functionality such as "Instant-Replay", "Picture-in-Picture" while remaining client agnostic (the client does not need any special hardware to perform these functions).

Furthermore, the invention can be (but doesn't have to be) integrated into hardware (DSLAM, router, switch, etc.) to provide a transparent service.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 2a-2e illustrate the operation of the synchronization unit, where FIG. 2a illustrates the "idle mode", FIG. 2b shows the "join mode", FIGS. 2c and 2d shown the "catching-up mode" and FIG. 2e illustrates the "caught-up mode";

FIG. 3 illustrates another embodiment of the milestone synchronization unit of the invention which enables filtering of the content;

DETAILED DESCRIPTION

To reiterate, the invention is applicable to any transport stream having a significant milestone corresponding to a full picture and characterized in that stream rendering cannot commence until certain milestone packets (or key structures) have been received and the beginning of a full picture. The multimedia stream delivery system of the invention provides a mechanism to deliver exactly what the subscriber terminal needs as soon as it requests a new program (channel), thereby reducing waiting time of arrival of, or randomly searching for, data structures in the data stream. This results in near instantaneous channel changing capabilities.

The invention is operational with numerous general purpose or special purpose subscriber terminals collectively called here "clients". Examples of clients that may be suitable for use with the invention include, but are not limited to, set top boxes, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Since MPEG protocols are most commonly used today, the invention is described here using, as an example, multicast MPEG2 transport streams containing audio and video elementary streams, PSI and other data. The significant milestones for the MPEG 2 transport streams are the PSI data including the PAT and PMT packets and packets containing start of data markers corresponding to the beginning of a GOP. It is however to be understood that the invention is also applicable to any stream of the type identified above. Also, the term packets is used to define the data in a stream; it is to be understood that that this term is intended to broadly cover any type of protocol data units that a broadcast multimedia stream may be comprised of.

To summarize the problem addressed here, channel change time in the IP-based audio/video transport systems creates significant delays in the consumers TV viewing/surfing experience. Channel change speed is adversely impacted by a plurality of factors, the delays being introduced at the server side of the delivery system, or at the client side. This specification describes a solution that reduces the channel change time introduced at the server, solution which is called "milestone synchronization". In the case of MPEG streams, I-frame latency is responsible mostly with the server side delays, and key press propagation delays, IGMP leave/join operations latency, packet buffering and propagation, PAT/PMT latency are responsible with the client side delays; the solution proposed here is referred to as "GOP synchronization".

Figure 1:
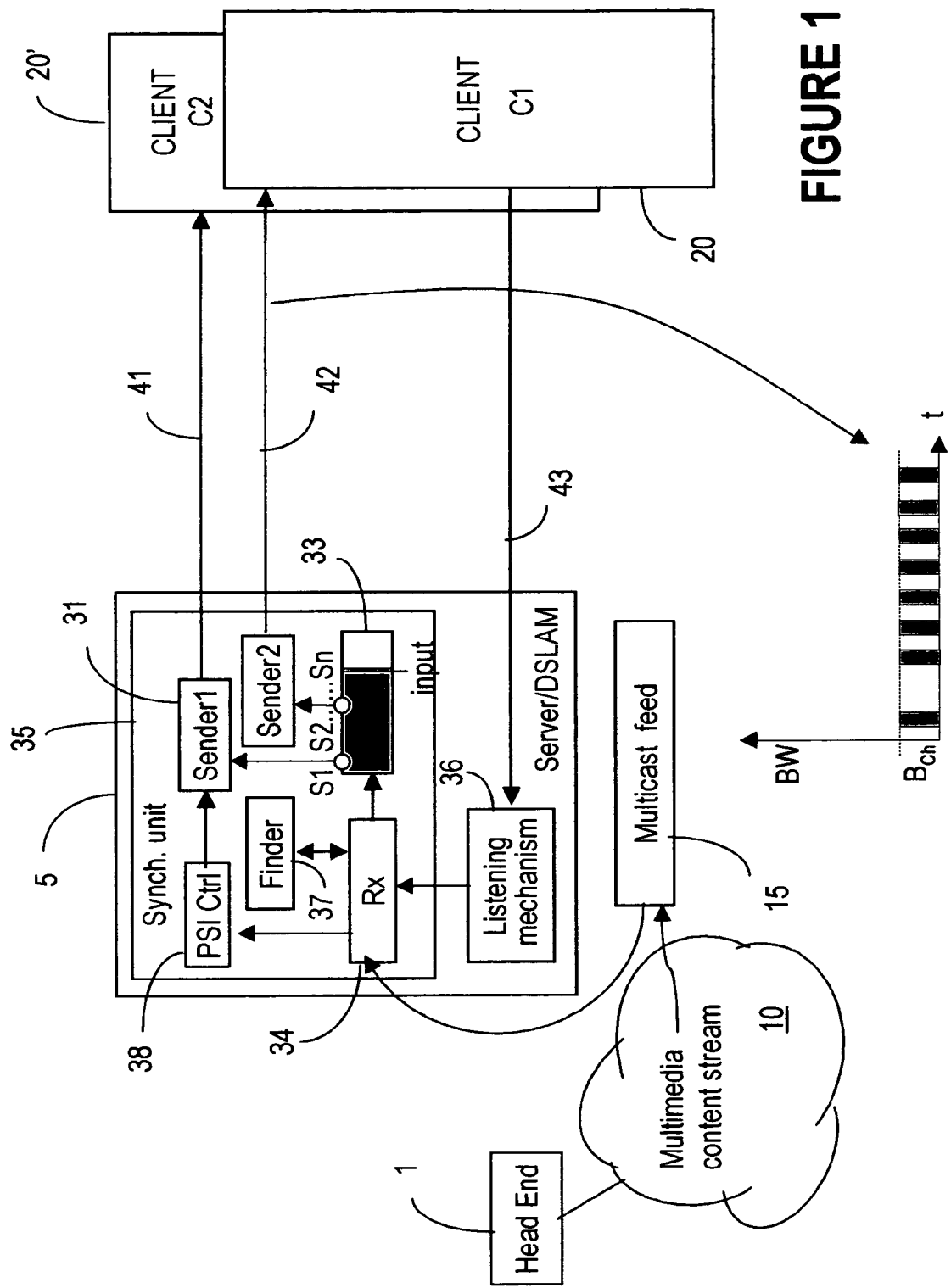
FIG. 1 illustrates an embodiment of the delivery system using the milestone synchronization approach according to the invention.

FIG. 1 shows the milestone synchronization approach according to the invention. In the server-client configuration of FIG. 1, a server 5 provided at the edge of a broadband network 10, receives encoded streams form a head-end 1 over a multicast feed 15. Multicast feed unit 15 includes also the means for multicasting the content streams to the clients. Server 5 delivers multimedia content to subscriber terminals (clients) 20, 20' on request. While FIG. 1 shows only two clients of server 5 it is obvious that the number of subscriber devices is not limited to two. The server ensures that the data streams (channels carrying multimedia content) transmitted to each client start with milestone data (including an I-frame for MPEG2) for enabling immediate and correct decoding.

Server 5 could be conveniently provided in a digital subscriber line access multiplexer (DSLAM) or within any network device already present close to the edge. In the case a DSLAM is used, the DSLAM sends unicast packets to individual lines 41, 42. Server 5 includes a client synchronization unit 35, a listening mechanism 36 and a PSI controller 38. Preferably, the listening mechanism is implemented using an "IGMP snoop", for any IGMP-enabled clients (players). IGMP (Internet Group Management Protocol) is defined in RFC 1112, 2236, 3376 as the Internet standard for IP multicasting. Today, all clients conforming to level-2 of the IP multicasting specification require IGMP (version 2 or higher). When the server is integrated in a router/switch that already supports IGMP snooping, the existing snoop mechanism may be readily adapted for use by the present invention.

The listening mechanism 36 sends out messages on a periodic basis to query which clients want to receive multicast traffic. The messages generated by the clients, called membership reports or requests, provide requests to join or leave specific multicasts. IGMP snooping 36 examines the reports and either enables or disables forwarding of that particular multicast. Examining the multicast address sent by the host enables IGMP snooping to provide automatic fine tune control that directs only the requested multicast traffic to the host, rather than all the multicast traffic.

Other mechanisms for detecting a channel change request may be equally used, such as an unicast listening HTTP mechanism, which is also available on all set-top boxes (i.e. listening mechanism 36 may be a HTTP/Javascript interface), or an RTSP mechanism. Advantageously, if detection of requests is implemented using IGMP snooping, the solution according to the invention will support multicast security enhancements and would time-out clients that no longer respond to IGMP queries.

Synchronization unit 35 keeps track of the milestones that occur in each stream, for enabling each client (player, STB)

20 to start receiving the channel it requests, starting with the most recent milestone in the stream after the announcement has been received by server 5. The synchronization unit 35 includes, for each stream to be managed according to the invention, a receiver unit 34, circular buffer 33, a finder 37, and one or more senders 31. The packets in the multicast transport stream received at the feed 15 are placed in circular buffer 33 by the receiver unit 34. There is a sender 31 for each respective client that requests to receive the content from that channel. Receiver unit 34 maintains buffer 33 and keeps track of the real-time position of the clients in the buffer.

The term 'real-time position' is used here for the packet that is currently sent by the respective sender to the associated client. The position in buffer 33 from where each sender 31 sends packets to the associated client is tracked from the most recent milestone at the moment a respective client requested the channel. Since requests from each client come at different times, each client is at a different position in the buffer. The term "end of the buffer" is used here to for the point marked "input" as the buffer fills from left to right. FIG. 1 shows markers (or pointers) with S1, S2 . . . . Sn, each marking the current packet sent by a respective sender 31. Whenever receiver unit 34 receives a new packet, it is added to the end of the buffer 33, each sender 31 transmits its next packet form the position marked S1-Sn and each marker S1-Sn increments the sender position in buffer 33, for keeping track of the position of the next packet to be sent. Sending of packets is thereby synchronized with the receipt of new packets providing a consistent packet delivery rate. Since requests come in randomly, each requestor (client) will be at a different packet in the buffer.

The buffer is designed large enough to enable capturing of all significant milestones and the packet marking the beginning of a full picture. The buffer size can be adjusted according to the rate and size of the milestone data structure (e.g. GOP size and the I-frame rate) with a possible reduction in overall bit rate if a larger buffer is used. In the case of a MPEG2 transport stream, the buffer must be larger than the largest conceivable GOP, which is in practice around a Megabyte (4 Mbps/8 bits/byte) for one second. The buffer size is matched to the packet size so that the receipt of packets can easily wrap-around to the beginning of the buffer when the end is reached.

Finder 37 is used for detecting the milestones in the incoming stream. As the buffer fills with the content from the respective stream, each packet is parsed using finder 37 to track the location of the most recent significant milestone within the buffer, and also to keep track of how much valid data has been loaded. The packets in the stream must be of a well defined format to support efficient parsing.

In the embodiment of FIG. 1, the program and system information data (which is PAT/PMT in the case of a MPEG2 stream) is kept separately, as shown by PSI (program and system information) unit 38. Unit 38 retrieves the program guide and system information from each stream and each channel in the respective stream. This information is processed separately and is sent to the requester of a specified channel, before sending any other data. This enables the decoder to immediately select the packets in the requested channel and decompress correctly the data.

FIGS. 2a to 2e illustrate the operation of the synchronization unit 35 according to the invention. FIG. 2a illustrates the synchronizer in the "idle mode", where streams are provided to both the receiver 34 and the feed 15. The receiver fills in the circular buffer 33 as shown by the bar marked "input, while it keeps tracks of the milestones detected by the finder (not shown on this Figure). The multicast hardware sends the streams to the respective active clients, in the known way. FIG. 2a shows that buffer 33 holds a first milestone denoted with M0; the milestone information is always available for whenever a new client. i.e. whenever a new request is received by the listening mechanism (not shown in this Figure). As indicated above, the milestones are different for different stream formats.

FIG. 2b shows the "join mode" of operation. When a "channel start" request 43 is detected by mechanism 36 (not shown on FIG. 2b) as arriving from a client C1, a sender 31, here Sender1, is allocated to that client based on the client identification, and a marker S1 for sender 31 is created at the most recent milestone (M1=S1). Sender1 begins sending packets to the client over port 39, the milestone information being always sent first. As stream delivery progresses and the packets are added to the end of the buffer ("input"), the sender marker S1 is incremented, and the sender sends the next packet from the new position. The outgoing stream is unicast.

Once started, Sender1 gradually catches-up with the input point, as shown in FIGS. 2c and 2d. The synchronizer now operates in a catching-up mode" for a certain period of time, during which time marker S1 strives to catch-up with the "input" point. There are various ways to achieve the catch-up. For example, the sender rate could be selected slightly higher than the input stream rate. In this way, the initial play-out rate could be slightly higher than the steady state rate, but the difference is not perceivable.

FIG. 2e illustrates the "caught-up mode". After a time, typically a number of seconds, the sender catches-up with the input point. This means that the multicast packet arriving at unit 15 is the packet that will be sent next to the client. At this point, Sender1 can switch on the multicast stream to deliver directly the stream to the client over port 39. This switch must be done within an intre-packet interval (2-3 msec). Sender1 switches itself "off" and the multicast unit 15 takes over delivering packets as they arrive. The synchronization unit 35 returns to the "idle mode" waiting for the next channel change request, but still processing the stream and keeping track of the milestones in anticipation of the next request.

If a second client C2 requests to join the same stream, the second client can simply join the multicast in progress. The channel change in this case could be rather slow due to stream latencies discussed above. Another option is for the server to switch back to unicast transmission for both clients C1 and C2 until both clients are synchronized. In this case, since Sender1 was using multicast (already caught-up), S1 is created at the "input" point. An S2 marker is created for Sender2 at the most recent milestone for the second request, and the synchronizer operates as shown in FIGS. 2b-2e. While Sender2 catches-up, each client receives unicasts delivery of the content in the respective stream. When both Sender1 and Sender2 are synchronized, clients are switched to multicast directly from feed 15.

Given that stream buffering can be reduced in a reliable network, play-out of a content stream can commence as soon as the decoder receives the respective milestone; as indicated above, this is in the case of MPEG the program association table (PAT), the program mapping table (PMT) and the beginning of a GOP, which contains an I-frame. The link between the client and the server is as a result very simple, as there is no need for negotiation, heartbeat or error-recovery mechanisms. The server is not required to "talk" with the clients using RTP (Reliable Transport Protocol) or similar protocols. As such, clients 20, 20' are more universal than the client in the prior art solution described above.

The stream is delayed somewhat according to the time between the receipt of the request and the most recent milestone in the buffer, but it is delivered completely intact, therefore all components of the stream are preserved and all elements of the stream (audio, video, entitlement and data) works correctly. In addition, as there is no burst of data before the client synchronizes to the milestone information, no extra bandwidth is necessary when sending a new channel, as shown in the insert.

The synchronization unit 35 shown in FIG. 1 could be enhanced to filter-out unnecessary packets for reducing the bandwidth to requestor. FIG. 3 shows an embodiment of the synchronization unit, denoted with 35A, which enables content filtering. Receiver synchronization unit 35A is provided with a packet filter 39 that "cleans" the stream before it is buffered in the circular buffer 33. For example, in the case of a MPEG2 stream, filter 39 discards the unnecessary MPEG2TS packets such as NULL packets, redundant PAT/PMT tables, etc., and sends to the clients streams 41', 42' which use less bandwidth, due to the discard of these packets. NULL packets are not typically required at the client and PAT/PMT packets are typically only required on the initial join.

As well, unit 39 may be set to filter the entitlement information so that only client-relevant information is passed through and so that critical entitlement (milestone) information can be delivered first. This again reduces the bandwidth to the client and the processing time. By filtering-out unnecessary packets, the system can allow for all clients to eventually catch up to the real-time receive point, allowing a switchover to occur so that the original multicast stream can then be sent directly through to the clients instead of the initial unicast.

Figure 4:
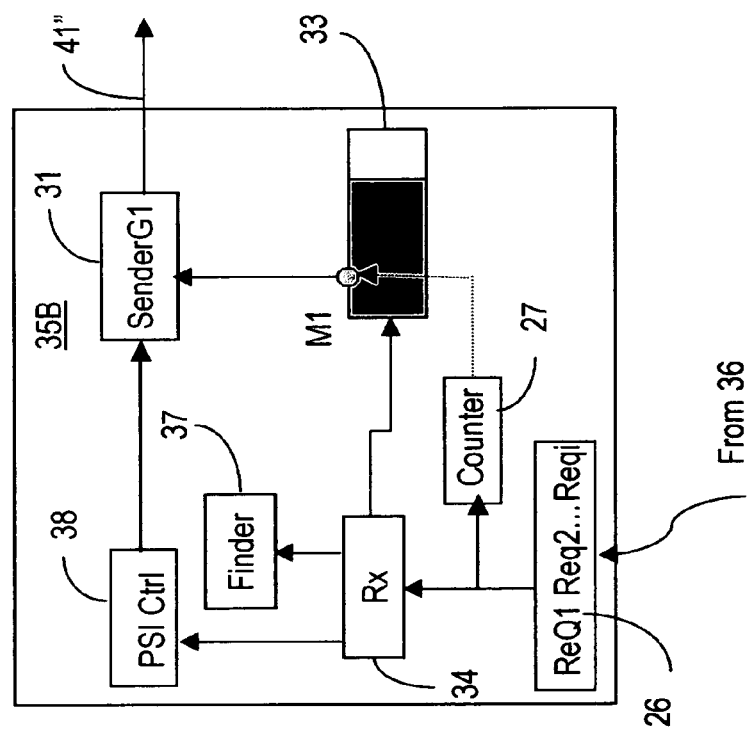
FIG. 4 illustrates still another embodiment of the milestone synchronization unit of the invention that leverages multicast.

As another enhancement, FIG. 4 shows a synchronization unit 35B where the number of streams sent to clients is reduced; this embodiment leverages multicast. Synchronization unit 35B is provided with means for batching the requests 43 received for the same channel, as shown at 26. The first request Req1 in a batch register 26, let's say a request for channel ChA received from client C1 starts a packet countdown before delivery of content starts, shown by counter 27. Each request in the batch register 26 is assigned to the same marker(s), e.g. M1, so that there is a maximum number of clients in a group G1 being served from the same milestone. A stream 41" is multicast to clients of group G1; some clients of the group will receive the requested content faster than others with respect to the time of their request. The size of the batch register is set according to the number of clients to be joined in a group for receiving the multicast stream 41". Once all the configured senders 31 are operating, any new client requests would be assigned to the sender which most closely aligns with the most recent critical milestone information.

While this embodiment might delay slightly the arrival of the required content, it would on the other hand reduce the number of independent clients that need to be tracked. In addition, this allows the server to multicast out to the clients using different multicast addresses, reducing the unicast scalability limitations if operating on a server separate from the DSLAM or network. It may be possible and necessary for the server to signal the IGMP control point to map the send multicast to the multicast address that the client expects, or it is possible to return the multicast address back to the client in the unicast response, if a request protocol such as HTTP is used.

Figure 5:
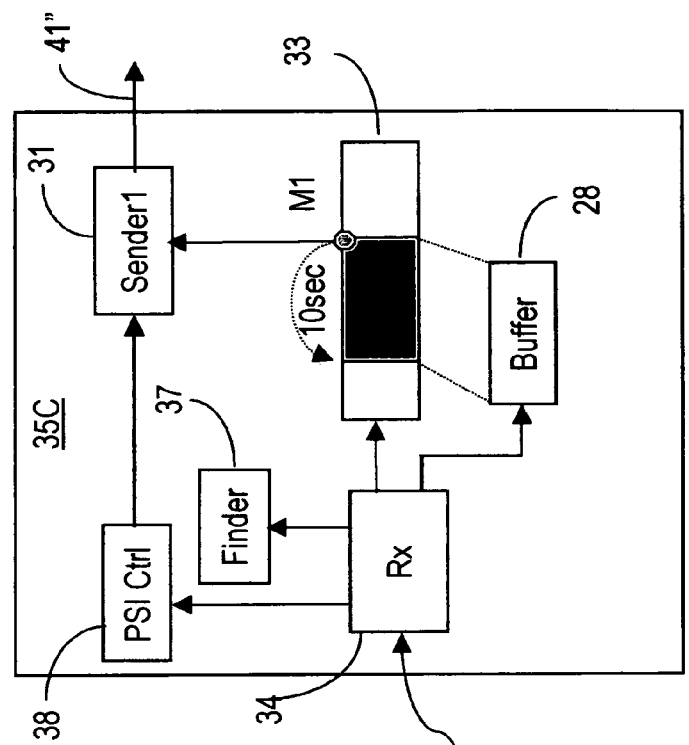
FIG. 5 illustrates a further embodiment of the milestone synchronization unit of the invention that enables content replay.

In another embodiment of the invention, shown in FIG. 5, a client synchronization unit 35C uses a buffer 28 (an arbitrary buffer of e.g. 10 seconds) to track a second copy of the "live" stream. When a client wants to perform an instant-replay function, the content of the buffer is copied to memory, and the user's marker is directed to it. At this point, the user can go back in time for the length of the buffer (10 seconds). Once satisfied, s/he would then rejoin the live stream.

As a further enhancement, since the buffer contains a full picture with the content of a respective stream at a known location, this mechanism allows creation of preview streams. This information may be used to generate snapshots of the stream or a low bit rate version of the stream as an I-frame only stream.

Figure 6:
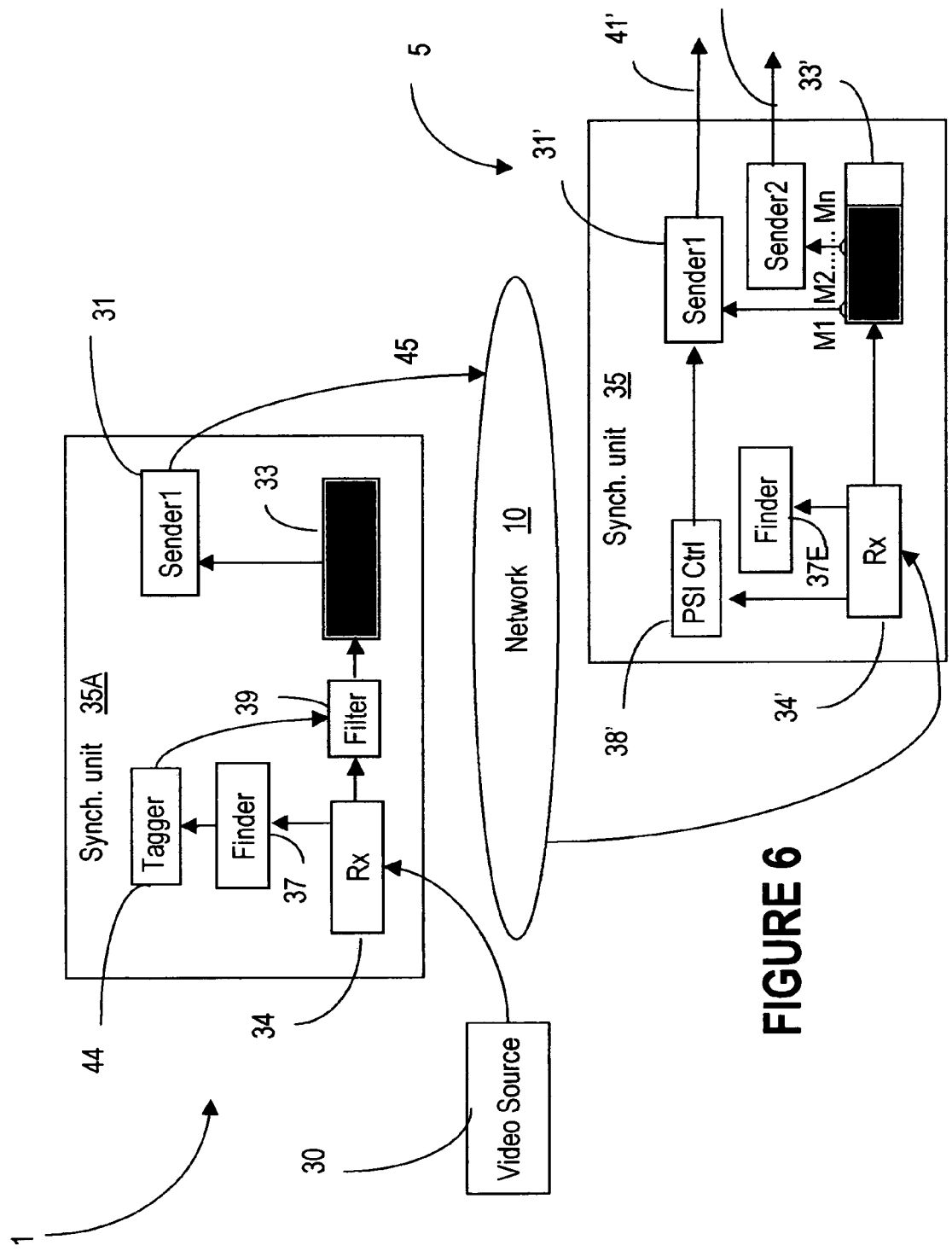
FIG. 6 shows a still another embodiment of the invention where the content is pre-processed at the head-end to simplify finding of milestone data at the server.

As a further enhancement, identification of critical milestones could be centralized at the head-end as shown in FIG. 6. In this embodiment, a synchronization unit 35D Using is provided on a server running at the head-end 1, and another synchronization unit 35 runs at the edge server 5. A video source 30 provides the encoded channels and the outgoing multicast streams 45 are modified by a tagger block 44 to identify milestones in the outgoing packets. This identification is provided in a way which can be easily located at server 5 and easily reversed before the stream is buffered at 33 and sent on to clients at the edge server 35. This embodiment simplifies the logic in the edge servers and makes the mechanism easier to implement in network equipment or DSLAMs.

We claim:

1. In a broadcast system that delivers entertainment content to clients over multimedia content streams, wherein stream rendering for the multimedia content streams cannot commence until a milestone data structure comprising program guide and system information (PSI) and a packet marking a beginning of a full picture data structure has been received, a server comprising:

a listening mechanism that detects requests from the clients, each of the requests indicating that a particular client wishes to receive a specified multimedia content stream carrying content of interest;

a synchronization unit that streams to the particular client an outgoing stream with the content of interest, starting with a most recent milestone data structure in the specified multimedia content stream with respect to a request receipt time from the request receipt time until the outgoing stream is synchronized with the specified multimedia content stream; and a multicast feed that receives all of said multimedia content streams from a head-end over a broadband network and distributes each of the multimedia content streams to the particular client once the outgoing stream is synchronized with the specified multimedia content stream, wherein the most recent milestone data structure enables the particular client to immediately decode the content of interest from the outgoing stream, and the synchronization unit further comprises:

a circular buffer;

a finder that detects all of the milestone data structures in the specified multimedia content stream;

a receiver that places packets from the specified multimedia content stream in the circular buffer as the packets arrive and keeps track of positions of the milestone data structures in the circular buffer;

a sender that creates markers in the circular buffer that correspond to most recent milestone data structures relative to the request receipt times and sends the packets from positions indicated by the markers, wherein the receiver places the packets in the circular buffer at a first rate and increments the markers at a second rate, higher than the first rate, until the positions of the markers catch up with a position of a last packet placed in the circular buffer.

2. The server of claim 1, further comprising:
a program guide and system information (PSI) controller, coupled to the receiver, that detects the program guide and system information (PSI) in the specified multimedia content stream and sends the detected information to the particular client in response to the request, before any of the packets are sent to the particular client.

3. The server of claim 1, wherein, for a Moving Picture Experts Group (MPEG) stream, the milestone data structure is an I-frame.

4. The server of claim 1, wherein a size of the circular buffer is adjusted according to rates and sizes of milestone data structures in the specified multimedia content stream.

5. The server of claim 1, wherein, for a MPEG2transport stream, a size of the circular buffer is larger than a largest conceivable group of pictures (GOP) in the specified multimedia content stream.

6. The server of claim 1, wherein a size of the circular buffer is matched to a packet size.

7. The server of claim 1, said synchronization unit further comprising:
means for reducing the bandwidth coupled to the outgoing stream from the receiver that discards packets unnecessary for stream play-out.

8. The server of claim 7, wherein, for a MPEG2 transport stream, said means for reducing the bandwidth further comprises:
a filter that discards NULL packets and Program Association Table/Program Map Table (PAT/PMT) packets sent by the receiver to the filter while the client plays-out the outgoing stream.

9. The server of claim 1, wherein whenever one client lodged a request for the specified multimedia content stream, the outgoing stream is unicast to the client, and whenever two or more clients request to join the same specified multimedia content stream, the two or more clients are assigned to the same marker, and the outgoing stream is multicast to the two or more clients.

10. The server of claim 1, the synchronization unit further comprising:
a second buffer, coupled to the receiver, that copies a certain number of content packets from the specified multimedia content stream sent by the receiver to the second buffer to enable instant-replay of the specified multimedia content stream.

11. The server of claim 1, provided at an edge of the broadband network, that serves a plurality of clients over a local network.

12. The server of claim 11, provided at the edge of the broadband network within any of a digital subscriber line access multiplexer (DSLAM) and a network device already present close to the edge of the broadband network.

13. The server of claim 1, wherein said listening mechanism uses an Internet Group Management Protocol (IGMP) snoop.

14. In a broadcast system that delivers entertainment content to clients over multimedia content streams, wherein stream rendering for the multimedia content streams cannot commence until a milestone data structure comprising program guide and system information (PSI) and a packet marking a beginning of a full picture data structure has been received, a synchronization unit comprising:

a circular buffer;
a finder that detects all of the milestone data structures in the specified multimedia content stream;
a receiver that places the packets from the specified multimedia content stream in the circular buffer as the packets arrive, and keeps track of positions of the milestone data structures in the circular buffer;
a sender that creates markers in the circular buffer that correspond to most recent milestone data structures relative to request receipt times, and sends the rackets from positions indicated by the markers, wherein the receiver places the packets in the circular buffer at a first rate and increments the markers at a second rate, higher than the first rate, until the positions of the markers catch up with a position of a last packet placed in the circular buffer.

15. The synchronization unit of claim 14, further comprising:
a filter, coupled to the receiver, that discards packets unnecessary for stream play-out.

16. The synchronization unit of claim 15, implemented in a server at the edge of a broadband network.

17. The synchronization unit of claim 15, implemented in a head-end to reduce bandwidth of said specified multimedia content stream over a broadband network by discarding packets unnecessary for stream play-out.

18. A method for delivering entertainment content to clients over multimedia content streams, wherein stream rendering for the multimedia content streams cannot commence until a milestone data structure comprising program guide and system information (PSI) and a packet marking a beginning of a full picture data structure has been received, comprising:
listening for a request indicating that a client wishes to receive a specified multimedia content stream carrying content of interest;
streaming to the client the content of interest in an outgoing stream, starting with a most recent milestone data structure in the specified multimedia content stream with respect to a request receipt time;
synchronizing the outgoing stream with the specified multimedia content stream;
switching from transmitting the outgoing stream to transmitting the specified multimedia content stream after the outgoing stream and the specified multimedia content stream are synchronized, wherein the synchronizing step further comprises:
providing, with a circular buffer, a delayed version of the specified multimedia content stream;
detecting all of the milestone data structures in the specified multimedia content stream;
placing, with a receiver, packets from the specified multimedia content stream in the circular buffer as the packets arrive at a first rate, while keeping track of positions of the milestone data structures in the circular buffer;
creating, with a sender, markers in the circular buffer that correspond to most recent milestone data structures relative to receipt request times;
sending packets from positions indicated by the markers, wherein the receiver places the packets in the circular buffer at a first rate and increments the markers at a second rate, higher than the first rate, until the positions of the markers catch up with a position of a last packet placed in the circular buffer.

* * * * *

UNITED STATES PATENT AND TRADEMARK OFFICE
CERTIFICATE OF CORRECTION

PATENT NO. : 7,668,914 B2
APPLICATION NO. : 11/090308
DATED : February 23, 2010
INVENTOR(S) : Alistair John Parker et al.

It is certified that error appears in the above-identified patent and that said Letters Patent is hereby corrected as shown below:

Col. 11 claim 5, line 1, please put a space between "MPEG2" and "transport".

Col. 12 claim 14, line 17, please change "rackets" to "packets".

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,668,914 B2 Page 1 of 1
APPLICATION NO. : 11/090308
DATED : February 23, 2010
INVENTOR(S) : Parker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this

Twenty-eighth Day of December, 2010

David J. Kappos
*Director of the United States Patent and Trademark Office*